United States Patent

McCune

[15] 3,697,174
[45] Oct. 10, 1972

[54] AUTOMATIC COLOR SUBJECT FAILURE CORRECTION WITH ILLUMINANT DISCRIMINATION FOR PHOTOGRAPHIC PRINTERS

[72] Inventor: Ellsworth J. McCune, Webster, N.Y.

[73] Assignee: Eastman Kodak Company, Rochester, N.Y.

[22] Filed: Dec. 7, 1970

[21] Appl. No.: 95,788

[52] U.S. Cl..................355/38, 178/5.2 A, 356/175
[51] Int. Cl............................................G03b 27/78
[58] Field of Search.......355/38; 356/175; 178/5.2 A

[56] References Cited

UNITED STATES PATENTS 3,527,540  9/1970  Bowker et al.................355/38
3,502,410  3/1970  King et al. ....................355/38

Primary Examiner—Samuel S. Matthews
Assistant Examiner—Richard A. Wintercorn
Attorney—Robert W. Hampton and Joseph F. Breimayer

[57] ABSTRACT

The color correction level of the printing beam of a color printer is automatically varied from a high color correction level to a low color correction level in proportion to the differences between the detected red, green and blue LATD's of the negative to be printed. A higher degree of color correction is automatically applied to alter the color composition of the printing beam when the negative exhibits an illuminant failure.

13 Claims, 2 Drawing Figures

ELLSWORTH J. McCUNE
INVENTOR.

BY Joseph F. Breinger
Robert W. Hampton

ATTORNEYS

ELLSWORTH J. McCUNE
INVENTOR.

AUTOMATIC COLOR SUBJECT FAILURE CORRECTION WITH ILLUMINANT DISCRIMINATION FOR PHOTOGRAPHIC PRINTERS

BACKGROUND OF THE INVENTION

1. Field of the Invention

This invention relates to photographic apparatus, and more particularly to apparatus for automatically altering the color composition of the printing beam of a color printer in accordance with the degree of color balance of a negative to be printed.

2. Description of the Prior Art

In subtractive color printers, for example, it is common practice to illuminate a color transparency, either positive or negative, with a source of wide band radiation, e.g. white light, and to project an image of the illuminated transparency in a printing beam onto a sheet of color print material. Three subtractive primary filters $F_c$ (cyan), $F_m$ (magenta) and $F_y$ (yellow) may be arranged to be selectively movable into and out of the printing beam of the projected image. The color composition of the printing beam may be monitored by three photosensors which are selectively responsive to the red, green and blue transmission densities of the projected image beam. Each of the photosensors may be connected to a capacitor which, under the influence of the output signal from the photosensor, charges to a predetermined voltage. As each capacitor charges to the predetermined voltage, a corresponding one of the three subtractive primary filters $F_c$, $F_m$ and $F_y$ is inserted into the printing beam. For example, after a time delay directly dependent upon the amount of red light striking the red photosensor, the cyan filter $F_c$ is inserted into the printing beam to halt the red exposure of the sheet of color print material. Similarly, the blue exposure of the sheet of color print material is halted when the yellow filter $F_y$ is inserted into the printing beam; and the green exposure is halted when the magenta filter $F_m$ is inserted into the printing beam. When all three filters are moved into the printing beam, the exposure is stopped, since, theoretically, all light is cut off from the printing beam by the filters; however, as a safeguard, an opaque shutter is usually inserted thereafter into the printing beam. A color printer similar to that herebefore described is disclosed in U.S. Pat. No. 3,184,307, issued May 18, 1965, and assigned to Eastman Kodak Company.

The rate at which the associated capacitors charge to the predetermined voltage sufficient to insert the color filters is dependent upon the red, green and blue large area transmission densities (LATD) of the negative to be printed. The color balance of an average population of negatives that the printer must accommodate widely varies from a normal or average color balance wherein the red, green and blue LATD's are relatively equal. A basic assumption of the large area monitoring concept is that the LATD's are representative of the densities of the principle subject area of interest in the negative. Thus, if the principle subject of interest is photographed against a background of predominantly blue sky or water, such as a distant water skier or sailboat, the large area density monitoring system does not sense the fact that the unusually high blue density of the negative is not typical of the principle subject area of interest. When the full color correction capabilities of the exposure determination system are utilized as described hereinbefore, the blue exposure will be terminated later than red and green exposure and the color balance of the resulting print will be objectionably yellow. Such a print is referred to as a color subject failure resulting from a predominance of one color in the scene captured by the negative. Obviously, color subject failures are not limited to any particular colors, but the most frequently encountered cases are associated with red backgrounds (furniture, clothing, etc.), green grass or foliage, and blue sky or water.

In order to prevent the printing of color subject failures, it has been found desirable to reduce the high color correction level of the exposure determining system described above by a linear combination of the red, green and blue LATD's of the negative to be printed. Thus the red exposure is made a function of all three LATD's rather than being based on red transmittance alone. In U.S. Pat. No. 3,120,782, issued Feb. 11, 1964, to Goddard et al. and assigned to the assignee of this application, there is disclosed such a system that has made it possible to easily adjust the rate of correction which the printer will introduce for variations in the LATD's of the population of negatives being printed.

However, there are another class of errors produced by sensitometric problems associated with camera exposure level, spectral quality of the exposing illuminant, film deterioration due to improper storage, processing variations and so forth, that require high levels of correction. The introduction of dual purpose color films designed to be exposed with either daylight or artificial illumination, as distinguished from earlier single purpose color films which were balanced for use with only one type of light, i.e., only daylight or artificial light, has resulted in a class of illuminant failure negatives; e.g., negatives erroneously exposed with tungsten lamps. In order to compensate for such sensitometric errors, it is necessary to maintain a high color correction level during printing.

Thus very low rates of correction for LATD variability are desirable when printing negatives which are normal in the sensitometric sense but abnormal in the sense that the distribution of colors in the original scene is unequal, i.e., when the negative exhibits a color subject failure; and relatively high rates of color correction for LATD variability are desirable when printing negatives which are abnormal in the sensitometric sense, i.e., illuminant failure negatives. This general problem is discussed at length in an article in the Journal of SMPTE, Apr. 1956, entitled "Exposure Determination Methods for Color Printing: The Concept of Optimum Correction Level" by Bartelson and Huboi. The authors conclude that there is an optimum compromise correction level for any integrated transmittance printing system which can be derived using linear regression techniques to provide the best statistical fit to the characteristics of the negative or transparency population being printed. In general, this optimum correction level falls in the range of 70 to 90 percent of full correction, depending on the season of the year.

Color subject failure remains a serious problem, however, even at correction levels as low as 70 percent. In more typical situations, where correction levels of 85 to 90 percent are required to adequately normalize the real errors in the negative population, the anomalous errors due to scene attributes result in extremely poor quality prints.

Furthermore, in color printing by automatic machinery presently employed in the industry, a common practice is to print all negatives a first time with no attempt to apply color correction. The resulting prints are inspected and those requiring color correction are reprinted with individual color correction applied by operator selected amounts. The reprinting operation is very wasteful of both materials and time. Significant cost reductions may be realized by the substantial elimination of the necessity for reprinting color subject failure and illuminant failure negatives.

SUMMARY OF THE INVENTION

Accordingly, it is an object of the present invention to reduce the number of color subject failure or illuminant failure prints produced from a normal population of negatives.

It is also an object of the present invention to determined from the color densities of a negative, the color correction level necessary to produce a color balanced print therefrom.

Another object of the invention is to vary the color correction level employed in printing a negative in accordance with a function of the color densities of the negative.

It is also an object of the present invention to provide a transition from a high color correction level to a low color correction level in accordance with a function of the red, green and blue LATD's of the negative to be printed.

A preferred embodiment of the present invention is disclosed in connection with the exposure control system of the color printer which comprises means to change the mode of color correction circuit of a color printer from a low color correction mode required for normal negatives and color subject failure negatives to a high color correction mode required for the correction of abnormal sensitometric errors such as illuminant failure negatives. A high level of density correction is maintained in both modes of operation.

More particularly, in accordance with a preferred embodiment of the invention, apparatus is provided for controlling the exposure of print material to N wavelengths of radiation in the printing beam of the photographic printer. Means responsive to the intensity of the N respective wavelengths of radiation produce N respective actuating signals after N respective time delays, from the start of the printing beam, that are dependent upon the intensities of said N respective wavelengths. Means responsive to the N actuating signals terminate the exposure of the print material to the N respective wavelengths in a sequence dependent upon the sequence in which the N actuating signals are produced. Color subject failure correction means respond to each of the N actuating signals, in the sequence in which they are produced, to shorten the time delay before the production of the remaining N − 1 actuating signals to lower the color correction in the printing beam.

In accordance with a further preferred embodiment of the invention, illuminant discriminating means respond to the occurrence of each of said N actuating signals in a predetermined sequence for lengthening the time delay before the termination of the exposure of the print material to selected wavelengths of radiation to raise the color correction in the printing beam.

The operation of the preferred embodiments of the invention to be described in detail hereinafter advantageously reduces the number of faulty prints exhibiting color subject failure and illuminant failure produced by an automatic color printer.

Other objects and advantages of the invention will become more apparent from the following description taken in conjunction with the accompanying drawings.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENTS

Figure 1:
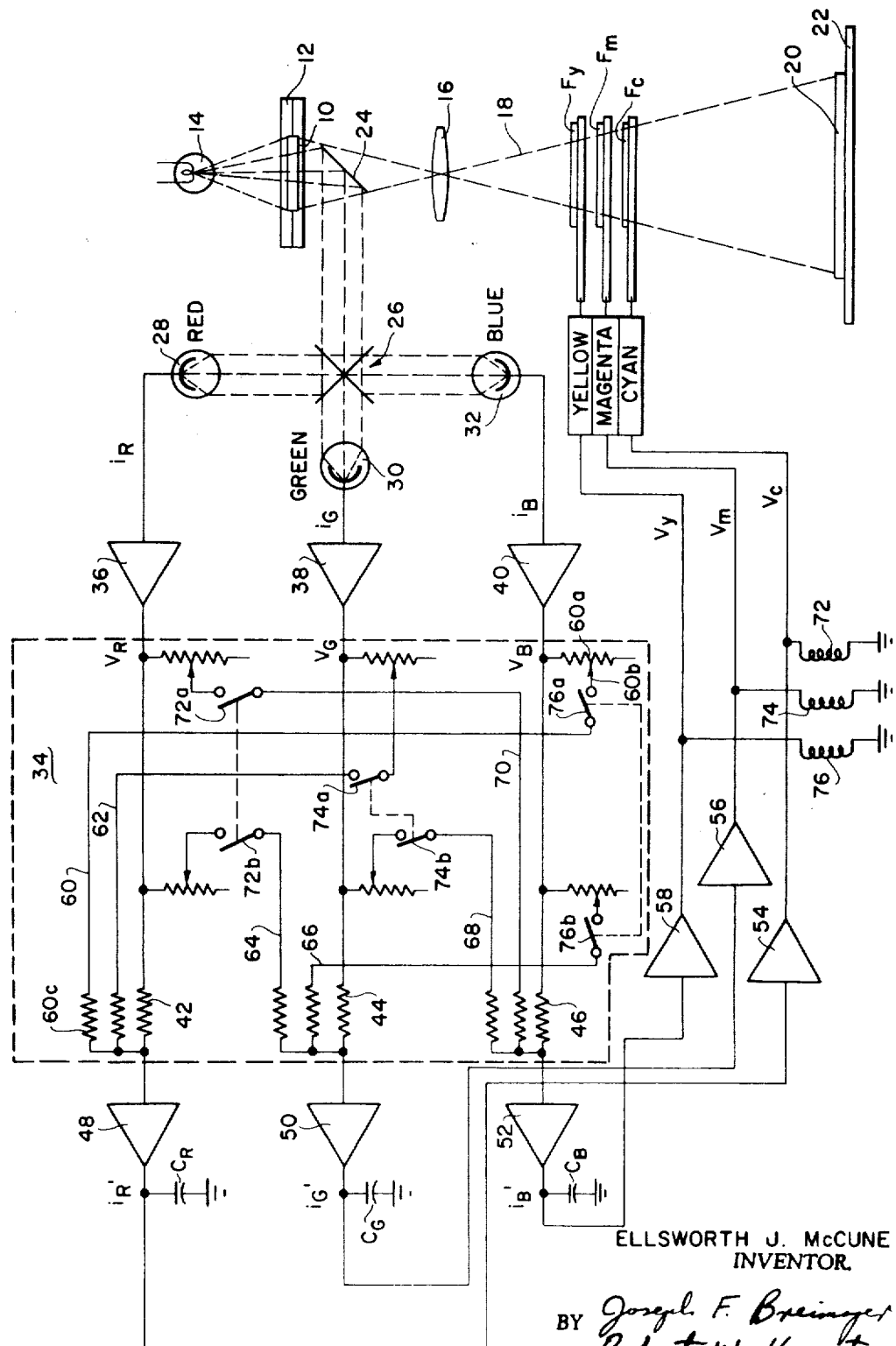
FIG. 1 is a circuit diagram of an automatic color subject failure correction circuit.

Referring now to the drawings and first to FIG. 1 there is shown an automatic color subject failure correction circuit responsive to the red, green and blue LATD's of the projected image of a negative to be printed to insert the cyan, yellow and magenta subtractive filters into the printing beam upon the charging of the N time delay capacitors $C_r$, $C_g$ and $C_b$ to a predetermined voltage level. More particularly, a transparency 10, either positive or negative, but referred to hereinafter as negative 10, mounted in negative holder 12 is located to intercept the light emitted by light source 14 of a conventional color printer. Lens 16 projects the image of negative 10 in a printing beam 18 onto the surface of a sheet of color print material 20 located on a platen 22.

A half-silvered mirror 24 located in the path of the printing beam reflects a small portion of the light in the printing beam to a beam splitter assembly 26 which directs a portion of that light to each of the N photosensors 28, 30 and 32. The N photosensors 28, 30 and 32 generate N respective photocurrent signals $I_r$, $I_g$ and $I_b$ having magnitudes dependent upon the red, green and blue LATD's of the projected image of the negative 10. The N photocurrent signals $I_r$, $I_g$ and $I_b$ are manipulated by the automatic color subject failure correction circuit 34, in a manner to be described in detail hereinafter, resulting in the generation of N actuating signals $V_c$, $V_m$ and $V_y$ which control the insertion of the subtractive color filters $F_c$, $F_m$ and $F_y$ into the printing beam.

The printing system as hereinbefore described is identical to that disclosed in U.S. Pat. No. 3,184,307 referred to hereinbefore. It should be noted that the red, green and blue photosensors 28, 30 and 32 are located with respect to the negative 10 and the subtractive filters $F_c$, $F_m$ and $F_y$ so that the photocurrent signals $I_r$, $I_g$ and $I_b$ are continually generated throughout the printing time period prior to, and after, the insertion of each filter into the printing beam.

The photocurrent signals $I_r$, $I_g$ and $I_b$, representative of the red, green and blue LATD's of the negative 10, are applied to the input terminals of amplifiers 36, 38 and 40 which transform the photocurrent signals into respective voltage signals $V_r$, $V_g$ and $V_b$. The gain of amplifiers 36, 38 and 40 is adjusted prior to printing customer negatives to produce an optimum print from a test negative, as is well known in the prior art. The voltage signals $V_r$, $V_g$ and $V_b$ are applied through resistors 42, 44 and 46, respectively, to the input terminals of amplifiers 48, 50 and 52, respectively. The amplifiers 48, 50 and 52 transform the voltage signals $V_r$, $V_g$ and $V_b$ into charging current signals $I_r'$, $I_g'$ and $I_b'$. The charging current signals $I_r'$, $I_g'$ and $I_b'$ charge N time delay capacitors $C_r$, $C_g$ and $C_b$, respectively, to a predetermined voltage over a period of time dependent upon the magnitude of the respective charging currents. When the time delay capacitors $C_r$, $C_g$ and $C_b$ are charged to the predetermined voltage, threshold amplifiers 54, 56 and 58, which are connected to the respective capacitors $C_r$, $C_g$ and $C_b$, generate N actuating voltage signals $V_c$, $V_m$ and $V_y$, respectively. As stated hereinbefore, the actuating voltage signals $V_c$, $V_m$ and $V_y$ are operative to insert the respective N subtractive filters $F_c$, $F_m$ and $F_y$ into the printing beam of the color printer.

Therefore, the circuit as described operates in a high color correction mode wherein the color print material 20 is exposed to the red, green and blue primary colors of the negative 10 for three exposure time periods dependent upon the red, green and blue LATD's of the negative 10. If the projected image of the negative 10 contains equal amounts of red, green and blue light, the filters $F_c$, $F_m$ and $F_y$ are inserted into the printing beam at substantially the same time, and an acceptable color print is produced. However, the majority of negatives, when projected in a color printer, do not exhibit equal red, green and blue LATD's. When the scene captured by the negative exhibits a preponderance of one color, the circuit operating in the high color correction mode will produce a print exhibiting color subject failure. For example, if the scene contains a predominance of blue, the projected image of the negative 10 will contain a predominance of the complementary color, yellow, and the blue LATD will be greater than the red and green LATD's. The lower red and green LATD's are translated into relatively large charging currents $I_r'$ and $I_g'$, and the larger blue LATD is translated into a relatively lower charging current $I_b'$ in the manner explained hereinbefore. The time delay capacitors $C_r$ and $C_g$ become charged to the predetermined voltage by the relatively large charging currents $I_r'$ and $I_g'$ prior to the time that the time delay capacitor $C_b$ becomes charged by the lower charging current $I_b'$ to the predetermined voltage. Thus, the exposure times of the sheet of color print material 20 to the red, green and blue colors in the printing beam are relatively unequal, with the blue exposure time being the longest. After the sheet of color print material 20 is processed, it exhibits a yellow hue indicative of a blue color subject failure.

To eliminate the production of prints exhibiting color subjecting failure, the automatic color subject failure correction circuit 34 further includes N (N–1) interconnecting circuits 60, 62, 64, 66, 68 and 70, each including in series connection a rheostat and movable contact arm (not enumerated in the figure for clarity). For example, interconnecting circuits 60 includes rheostat 60a, movable contact arm 60b, and resistor 60c. Furthermore, each interconnecting circuit includes a normally open relay switch, enumerated below, in series therewith.

The normally open relay switches 72a, 72b, 74a, 74b, 76a and 76b are operated by N relay coils 72, 74 and 76, respectively, that are connected to the output terminals of threshold amplifiers 54, 56 and 58, respectively. When the relay coils 72, 74 and 76 are energized by actuating voltage signals $V_c$, $V_m$ and $V_y$, respectively, the associated normally open switches are closed. For example, upon the generation of voltage signal $V_c$, relay coil 72 is energized, and normally open relay switches 72a and 72b are closed. Furthermore, the cyan filter $F_c$ is inserted into the printing beam 18 of the color printer, thus terminating the exposure of color print material 20 to the red color in the projected image. However, photocurrent signal $I_r$ and voltage signal $V_r$ continue to be generated in response to the continued detection of the red LATD by photosensor 28. Upon the closure of relay switches 72a and 72b, the voltage signal $V_r$ is applied by interconnecting circuits 64 and 70 to the summing input terminals of amplifiers 50 and 52, respectively. The addition of the voltage signal $V_r$ to the N – 1 voltage signals $V_g$ and $V_b$ results in an increase in the magnitudes of the N – 1 charging currents $I_g'$ and $I_b'$ and a corresponding shortening of the time period of the exposure of the color print material 20 to the green and blue colors in the projected image of the negative 10.

In the same manner, the voltage signals $V_g$ and $V_b$ are added to each other and to voltage signal $V_r$ upon the energization of relays 74 and 76, respectively.

Therefore, the circuit 34 automatically switches from a high color correction to a low color correction mode as the subtractive filters are inserted into the printing beam of the color printer. If the negative 10 exhibits a preponderance of one color such as yellow, the magenta and cyan filters $F_m$ and $F_c$ are inserted into the printing beam 18 within a very short time after the exposure is begun. At that instant the relay coils 72 and 74 are energized, and the normally open switches 72a, 72b and 74a, 74b are closed. Thereafter the voltage signals $V_r$ and $V_g$ are added by interconnecting circuits 68 and 70 to the summing input terminal of amplifier 52, thus increasing the charging current $I_b$. The increase in the charging current $I_b'$ will shorten the charging time of capacitors $C_b$, thus lowering the color correction of the circuit 34. In like manner, the voltage signals $V_r$ and $V_g$ are combined to lower the color correction of the circuit 34 in the order of their magnitudes. The settings of the movable contact arms of the rheostats in the interconnecting circuits may be varied to alter the proportions in which the charging currents are combined.

The automatic color subject failure correction circuit 34 of FIG. 1 may be modified in accordance with the teachings of the present invention to provide for automatic correction of red-yellow illuminant failure negatives. Such sensitometric errors are caused by exposure of daylight or blue flash film to tungsten lighting and/or white flashbulbs. A high level of color correction is necessary to correct for these illuminant failure negatives. The automatic color subject failure correction circuit 34 of FIG. 1 is designed to lower the color correction in proportion to the degree of difference in the red, green and blue LATD's of the projected image of the negative to be printed. Therefore, the requirement of a high degree of color correction and a low degree of color correction are diametrically opposed. It is, therefore, necessary to compromise and to provide a high degree of color correction when the negative contains high red density, a medium green density and a low blue density which is assumed to be caused by an illuminant failure, and to provide a low degree of color correction for the remaining possible relationships of the colors in the negative. With this assumption, color subject failure correction is sacrificed in the red-yellow area, and illuminant failures consisting of excessive blue light are not corrected. It will be obvious that other compromise conditions are possible by proper selection of the logic circuitry described hereinafter.

Figure 2:
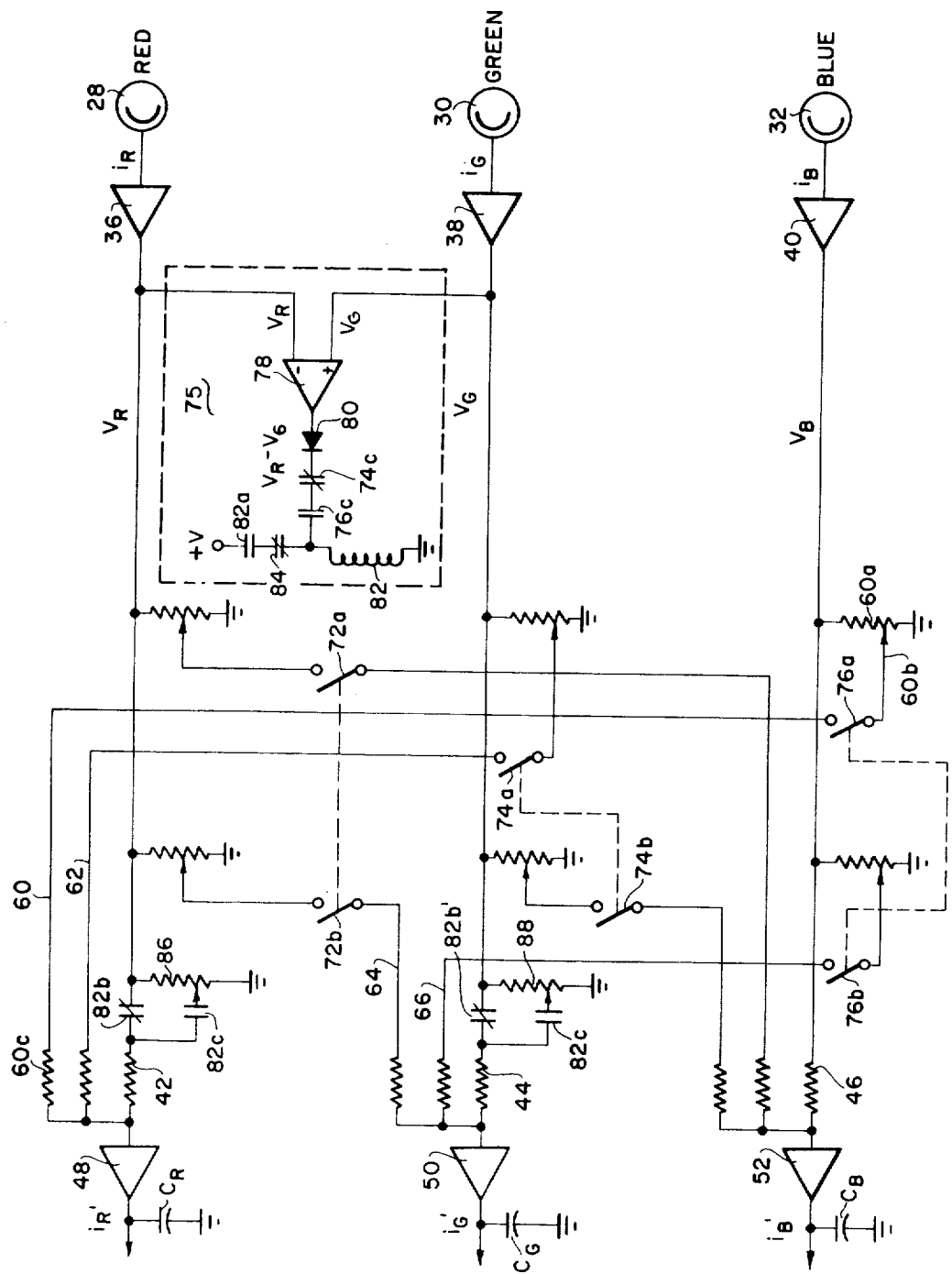
FIG. 2 is a circuit diagram of an automatic color subject failure correction circuit with illuminant discrimination.

Referring now to FIG. 2 there is shown an automatic color subject failure correction circuit having the same general elements as circuit 34 of FIG. 1 and including an illuminant discriminator circuit 75. The illuminant discriminator circuit 75 operates in accordance with the mathematical relationship $V_b > V_g > V_r$ to provide correction for a red-yellow illuminant failure and will provide such correction only upon the existance of this relationship.

The illuminant discriminator circuit 75 includes differential amplifier 78 having a negative input terminal adapted to receive voltage signal $V_r$ and a positive input terminal adapted to receive voltage signal $V_g$ and an output terminal at which is produced an output signal when $V_g > V_r$. A diode 80, a normally closed switch 74c and a normally open relay switch 76c are connected in series between the output terminal of differential amplifier 78 and one terminal of a relay coil 82. The relay coil 82 is also connected at the same terminal through normally open latching relay switch 82a and normally closed relay switch 84 to a voltage source + V. The normally closed relay switch 84 opens to deenergize relay coil 82 when the shutter is inserted into the printing beam of the color printer at the termination of printing. The relay coil 82 further controls the normally closed relay switches 82b, 82b' and the normally open relay switches 82c, 82c'.

In the absence of a red-yellow illuminant failure, $I_g' > I_b'$, and the normally closed relay switch 74c is opened upon the energization of relay coil 74 (FIG. 1) simultaneously or before the normally open relay switch 76c is closed by the energization of relay coil 76 (FIG. 1). Therefore, regardless of the relationship of $V_r$ and $V_g$, the output signal of differential amplifier 78 cannot be applied to the relay coil 82, and the relay switches 80b and 80b' remain closed. The circuit thereafter performs in the low color correction mode as described with respect to circuit 34 of FIG. 1.

However, when the negative to be printed exhibits a red-yellow illuminant failure, i.e., $V_b > V_g$, the relay coil 76 (FIG. 1) is energized before the relay coil 74 is energized. Consequently, the normally open relay switch 76c is closed before the normally closed relay switch 74c is opened, and the output signal of differential amplifier 78 is applied to relay coil 80. Thereafter relay coil 82 is latched to the voltage source + V by the closing of normally open relay switch 82a. Simultaneously the normally closed relay switches 82b and 82b' are open and the normally open relay switches 82c and 82c' are closed. The closure of the relay switches 82c and 82c' introduces an additional attenuating impedance, determined by the setting of the movable contact of rheostats 86 and 88, into the input circuit of amplifiers 48 and 50. The introduction of the additional attenuating impedances attenuates the voltage signals $V_r$ and $V_g$ thus reducing the charging current signals $I_r'$ and $I_g'$, respectively. The reduction of the charging current signals $I_r'$ and $I_g'$ increases the charging time of time delay capacitors $C_r$ and $C_g$ and lengthens the exposure time of the color print material 20 to the red and blue color components in the printing beam 18 (FIG. 1). Thus the automatic color subject failure correction circuit operates as before described, its effect is decreased under these conditions, and the red-yellow illuminant failure negative is printed at a high color correction level.

It is obvious that the illuminant discriminator circuit 75 can be easily switched off if, in the opinion of the operator, red-yellow subject failure correction is more desirable than red-yellow illuminant correction. It is also obvious that the selection of or the addition of other logic circuits can provide high color correction levels with respect to any other sensitometric errors exhibited by the negative to be printed.

From the description of the preferred embodiments set forth above, it is apparent that the invention can be practiced in many alternative ways. It is apparent that the invention may be practiced in substantially the same manner as disclosed in the preferred embodiment to correct for a detected imbalance of the N photocurrents $I_n, I_{n-1}, \ldots I_1$ that does not satisfy the relationship $I_n > I_{n-1} \ldots > I_1$. Furthermore, it is apparent that the invention may be modified to automatically control the color correction employed in additive as well as subtractive color printing.

Also, it is apparent that the invention may be practiced in connection with a color correction circuit wherein the time delay capacitors are charged directly from the photocurrent generated by the photosensors.

As may be seen a novel system has been disclosed for automatically correcting for color subject failure negatives in proportion to the differences between the red, green and blue LATD's of the negative to be printed. It is apparent that the invention as disclosed and described in connection with preferred embodiments thereof represents an improvement to the existing color correction circuits that may realize substantial reductions in time and material waste of automatic printers.

The invention has been described in detail with particular reference to preferred embodiments thereof, but it will be understood that variations and modifications can be effected within the spirit and scope of the invention.

I claim:

1. In a photographic printer, apparatus for controlling the exposure of print material to N selected wavelengths of radiation in the printing beam, and apparatus comprising:

a. means responsive to the intensity of the N respective wavelengths of radiation in the printing beam of the photographic printer for producing N respective actuating signals after N time delays, measured from the time that the printing beam commences to expose the print material, that are dependent upon the intensity of said N respective wavelengths of radiation;

b. first means responsive to the N actuating signals for terminating the exposure of the print material to the N respective wavelengths of radiation in the printing beam as each of the N actuating signals are produced;

c. second means responsive to each of the N actuating signals, as they are produced in time, for shortening the time delays before the production of the remaining actuating signals to lower the spectral correction in the printing beam of the photographic printer; and d. third means responsive to the occurrence of the N actuating signals in a predetermined time sequence for lengthening the time delay before the production of the remaining actuating signals to provide a high degree of spectral correction in the printing beam of the photographic printer.

2. The apparatus of claim 1 wherein said intensity responsive means further comprises:

a. N photosensors, said photosensors being responsive to the intensity of N respective wavelengths of radiation in the printing beam of the photographic printer for producing N first signals each having a magnitude dependent upon the intensity of a respective wavelength; and b. N time delay means each having an input terminal connected to a respective one of said photosensors and each having an output terminal, each of said time delay means being responsive to the respective first signal produced by the photosensor connected to its input terminal for producing an actuating signal at said output terminal after a time delay dependent upon the magnitude of the photocurrent signal.

3. The apparatus of claim 2 wherein said first means further comprises:

a. N movable color filters, each of said color filters having the property of terminating the exposure of the print material to one of said N respective wavelengths of radiation in the printing beam of the photographic printer; and b. N actuator means coupled to said N movable color filters and individually responsive to said N control signals for moving the respective movable color filters into the printing beam of the photographic printer.

4. The apparatus of claim 1 wherein said first means further comprises:

a. N movable color filters, each of said color filters having the property of terminating the exposure of the print material to one of said N respective wavelengths of radiation in the printing beam of the photographic printer; and b. N actuator means coupled to said N color filters and individually responsive to said N control signals for moving the respective color filters into the printing beam of the photographic printer.

5. The apparatus of claim 2 wherein said second means further comprises means responsive to each of said N actuating signals, in the sequence in which they are produced, for connecting the first signal applied to the input terminal of the time delay means producing the control signal to the input terminals of the remaining time delay means.

6. The apparatus of claim 5 wherein said first means further comprises:

a. N movable color filters, each of said color filters having the property of terminating the exposure of the print material to one of said N respective wavelengths of radiation in the printing beam of the photographic printer; and b. N actuator means coupled to said N movable color filters and individually responsive to said N control signals for moving the respective movable color filters into the printing beam of the photographic printer.

7. The apparatus of claim 2 wherein said N first signals are designated $I_n, I_{n-1}, \ldots I_1$, respectively, and further comprising:

a. means responsive to an imbalance in the magnitudes of the first signals, represented by $I_n > I_{n-1} \ldots > I_1$, for producing an illuminant correction signal representative of the imbalance in magnitude therebetween; and b. attenuating means responsive to said illuminant correction signal for attenuating the magnitude of the first signal $I_1$ thereby lengthening the time delay before the production of the actuating signal by the time delay means responsive to the first signal $I_1$.

8. In a photographic printer, exposure control apparatus comprising:

a. N movable subtractive color filters, each of said color filters having the property of absorbing light of a respective one of N colors in the printing beam of the color printer;

b. N photosensors, each of said photosensors being responsive to the intensity of a respective one of N wavelengths of light in the printing beam of the color printer for producing N photocurrent signals each having a magnitude dependent upon the intensity of the respective color;

c. N time delay means each having an input terminal connected to a respective one of said photosensors and each having an output terminal, each of said time delay means being responsive to the respective photocurrent signal coupled to its input terminal for producing an actuating signal at its output terminal after a time delay dependent upon the magnitude of the photocurrent signal;

d. N actuator means coupled respectively to said color filters and responsive to said actuating signals for moving said color filters into the printing beam of the color printer in a sequence dependent upon the sequence in which the N actuating signals are produced; and e. color subject failure correction means responsive to each of said N actuating signals, in the sequence in which they are produced, for coupling the corresponding N photocurrent signals that are applied to the input terminals of each of the N time delay means to the input terminals of the remaining N − 1 time delay means to shorten the time period between the occurrences of the N actuating signals to lower the color correction in the printing beam of the color printer.

9. The apparatus of claim 8 wherein said color subject failure correction means further comprises:
   a. N interconnecting circuits connected between each of the N photosensors, respectively, and the input terminals of the remaining N − 1 time delay means, each interconnecting circuit including a normally open switch; and
   b. N switch control means respectively connected to the output terminals of the N time delay means and responsive to the N actuating signals, respectively, to close the N normally open switches in the interconnecting circuit connected to the input terminals of the remaining N − 1 time delay means.

10. The apparatus of claim 9 wherein said N photocurrent signals are designated $I_n, I_{n-1}, \ldots I_1$, respectively, and further comprising:
   a. illuminant discriminator means responsive to an imbalance in the magnitudes of the N photocurrent signals, represented by $I_n > I_{n-1} \ldots > I_1$, for producing an illuminant correction signal related to the imbalance in the magnitudes of the photocurrent signals and indicative of a detected illuminant failure negative; and
   b. attenuating means responsive to the illuminant correction signal for attenuating the photocurrent $I_1$ to thereby lengthen the time period before the subtractive color filter associated with the photocurrent signal $I_1$ is moved into the printing beam of the color printer.

11. The apparatus of claim 8 wherein said N photocurrent signals are designated $I_n, I_{n-1}, \ldots I_1$, respectively, and further comprising:
   a. illuminant discriminator means responsive to an imbalance in the magnitudes of the N photocurrent signals, represented by $I_n > I_{n-1} \ldots > I_1$, for producing an illuminant correction signal related to the imbalance in the magnitudes of the photocurrent signals and indicative of a detected illuminant failure negative; and
   b. attenuating means responsive to the illuminant correction signal for attenuating the photocurrent $I_1$ to thereby lengthen the time period before the subtractive color filter associated with the photocurrent signal $I_1$ is moved into the printing beam of the color printer.

12. In a color printer, exposure control apparatus comprising:
   a. three movable subtractive color filters, said color filters having the property of absorbing red, green and blue light, respectively;
   b. three photosensors, said photosensors being respectively responsive to the intensity of red, green and blue light in the printing beam of the color printer for producing three photocurrent signals, designated $I_r$, $I_g$ and $I_b$, each having a magnitude dependent upon the intensity of each respective color;
   c. three time delay means, respectively designated red, green and blue, each having an input terminal connected to a respective one of said photosensors and each having an output terminal, said time delay means being responsive to the respective photocurrent signal connected to its input terminal for producing an actuating signal at said output terminal after a time delay dependent upon the magnitude of the applied photocurrent signal;
   d. three actuator means individually coupled to said filters and responsive to said actuating signals for moving said color filters into the printing beam of the color printer in a sequence dependent upon the sequence in which the three actuating signals are produced; and
   e. color subject failure correction means responsive to each one of the three actuating signals, in the sequence in which they are produced, for shortening the time delay before the production of the remaining actuating signals to lower the color correction of the printing beam of the photographic printer, said color subject failure correction means further comprising:
      1. a first pair of interconnecting circuits connected between the red color responsive photosensor and the input terminals of the green and blue time delay means, each interconnecting circuit including a normally open switch;
      2. a second pair of interconnecting circuits connected between the green color responsive photosensor and the input terminals of the red and blue time delay means, each interconnecting circuit including a normally open switch;
      3. a third pair of interconnecting circuits connected between the blue color responsive photosensor and the input terminals of the red and green time delay means, each interconnecting circuit including a normally open switch; and
      4. three switch control means respectively connected to the output terminals of the red, green and blue time delay means and responsive to the actuating signals produced by the corresponding time delay means to close the pair of normally open switches in that pair of interconnecting circuits connected to the corresponding color responsive photosensor and the other two time delay means.

13. The apparatus of claim 12 further comprising:
   a. illuminant discriminator means responsive to an imbalance in the magnitudes of the red, green and blue photocurrent signals, the imbalance represented by $I_b > I_g > I_r$, for producing an illuminant correction signal indicative of a detected illuminant failure negative; and
   b. attenuating means connected between the red photosensor and the input terminal of the red time delay means and between the green photosensor and the input terminal of the green time delay means, said attenuating means being responsive to the illuminant correction signal for attenuating the photocurrents $I_r$ and $I_g$ to lengthen the time period before the corresponding control signals are produced by the red and green time delay means.

* * * * *